Patented June 2, 1936

2,043,078

UNITED STATES PATENT OFFICE 2,043,078

DICHLORO-ANTHRAQUINONE-ACRIDONES AND PROCESS FOR PREPARING THE SAME

Robert Fraser Thomson, William Smith, and James Primrose, Grangemouth, Scotland, assignors to Imperial Chemical Industries Limited, a corporation of Great Britain No Drawing. Original application October 14, 1931, Serial No. 568,862. Divided and this application July 21, 1933, Serial No. 681,556. In Great Britain October 18, 1930

9 Claims. (Cl. 260—37)

This invention relates to the manufacture of anthraquinone derivatives, particularly of anthraquinone-acridones and of intermediate compounds therefor.

The condensation of 1-halogenoanthraquinone-2-carboxylic acid and its derivatives (e. g. mononitrated 1-chloroanthraquinone-2-carboxylic acid, monochlorinated 1-chloroanthraquinone-2-carboxylic acid, and 1,4-dichloranthraquinone-2-carboxylic acid) with arylamines, and the conversion of the products into anthraquinone-acridones, are described in British Patent No. 894/1911, and the use of the corresponding 1-halogenoanthraquinone-2-carboxylic esters in similar condensation and acridonation is the subject of British Patent No. 8230/1912. More recently there has been described in British Patents Nos. 311,283 and 314,899 the condensation of anthraquinone-acridones carrying, besides halogen in the benzene ring, a halogen atom in position 4 of the anthraquinone nucleus, with amino-anthraquinones and with arylamines of the benzene or naphthalene series, respectively.

In this state of the prior art researches have been made and we have discovered that anthraquinone-1,2-acridones of the formula

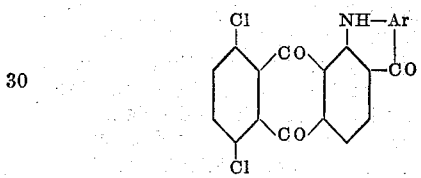

wherein Ar is an o-arylene residue of the benzene, naphthalene or anthracene series (which may if desired carry substituents), have very valuable properties, partly as vat dyes themselves, partly as intermediate products for the manufacture of other dyes.

It is an object of this invention, therefore, to provide compounds of the above structure. It is a further object of the invention to provide intermediate products suitable for the manufacture of compounds of that structure. Other objects will appear as the specification proceeds.

These objects are achieved by the following invention. We use as starting material 1,5,8-trichloro-2-methyl-anthraquinone, which we have found can be oxidized smoothly by means of manganese dioxide in a sulphuric acid medium to give 1,5,8-trichloroanthraquinone-2-carboxylic acid. In order to obtain commercially useful yields of this acid it is necessary to use manganese dioxide in sulphuric acid as the oxidant, and it is advantageous to work at a temperature of about 70° C.

The next step is to condense the trichloro-acid with an arylamine of the benzene, naphthalene or anthracene series, whereby the chlorine in position 1 is replaced by the arylamino group. This condensation is effected in the usual manner, e. g. in the presence of an acid-absorber and a copper catalyst. Amongst suitable arylamines may be mentioned aniline, β-naphthylamine, aminoanthraquinones, aminobenzoyl-o-benzoic acids, etc. The products from aminobenzoyl-o-benzoic acids may of course subsequently be cyclized by treatment with sulphuric acid so as to give products identical with those obtained from the corresponding aminoanthraquinones.

The substances resulting from the foregoing operations have the structure:

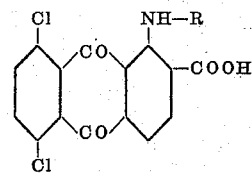

wherein R stands for an aryl group of the benzene, naphthalene or anthracene series, which may if desired carry substituents.

These substances are now converted by customary means, e. g. by treatment with sulphuric acid, into acridones of the formula

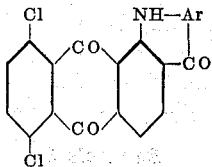

wherein Ar stands for an o-arylene residue of the benzene, naphthalene or anthracene series, which may if desired carry substituents. The acridones so obtained are vat dyes.

If desired, the novel compounds may be condensed with amines or substituted amines containing replaceable hydrogen to give novel vat dyestuffs of the anthraquinone-acridone series. This condensation and the products resulting therefrom are described more fully and claimed in our copending application, Ser. No. 568,862, of which the instant application is a division.

The following examples, which are given by way of illustration only and are in no sense limitative, serve to explain more fully certain embodiments of the invention.

*Example 1*

This example describes the preparation of one of the starting materials for our process, 1,5,8-trichloroanthraquinone-2-carboxylic acid.

30 parts of 2-(4'-methylbenzoyl)-3,6-dichlorobenzoic acid and 500 parts of 5% oleum are heated at 90° C. for one hour. The temperature of the solution is then raised to 105° C. and maintained there till ring-closure is complete. This generally takes about 3 hours. The dark brown solution is then cooled and water carefully added to reduce the strength of the acid to 80% $H_2SO_4$; after cooling to room temperature the pale yellow crystals which separate are filtered on asbestos, washed with 80% sulphuric acid till the filtrates are colorless and then with water till free of acid. The pale yellow material obtained in this way melts at 246–248.5° C. and consists of 2-methyl-5,8-dichloranthraquinone.

20 parts of 2-methyl-5,8-dichloro-anthraquinone are dissolved in 200 parts of 5% oleum. The solution is cooled to 3–5° C. and chlorine gas passed into the solution until the required increase in weight for the introduction of one atom of chlorine is obtained. A small sample is then withdrawn from the melt and tested, if it shows the correct amount of chlorine the whole is poured into 2000 parts of water and the pale yellow 1,5,8-trichloro-2-methyl-anthraquinone filtered off, and washed acid free with water.

15 parts of 1,5,8-trichloro-2-methyl-anthraquinone are dissolved in 330 parts of concentrated sulphuric acid and the solution heated to 68–72° C. 36 parts of finely ground manganese dioxide are then added over 3 hours. After the addition of the manganese dioxide is complete the mixture is heated a further eleven hours at 69–72° C. It is then cooled, poured into 2000 parts of water and filtered. The cake after washing free of acid is taken up with a solution of 10 parts of sodium carbonate in 200 parts of water and solution so obtained filtered to remove any unchanged manganese dioxide. The filtrates are then made acid with hydrochloric acid, cooled and filtered. The carboxylic acid is washed free from mineral acid and dried.

*Example 2*

9 parts of 1,5,8-trichloro-anthraquinone-2-carboxylic acid, 9 parts of β-naphthylamine, 8 parts of potassium acetate, 0.5 parts of copper acetate and 180 parts of amyl alcohol are heated under a reflux condenser for 2½ hours. The violet reaction mass is filtered hot, well pressed and taken up with dilute hydrochloric acid, boiled and filtered.

*Example 3*

9 parts of 1-β-naphthylamino-5,8-dichloro-anthraquinone-2-carboxylic acid obtained as described above are heated with 45 parts of dry nitrobenzene and 6.5 parts of acetic anhydride at 90–95° C. for 2½ hours. The solution obtained is cooled to 30° C. and 1.84 parts of concentrated sulphuric acid dripped in. The solution is warmed to 100–105° C. for 2 hours, cooled and filtered, washed with nitrobenzene and methylated spirits. The 5,8-dichloroanthraquinone-2,1(β)-naphthacridone dyes cotton yellowish red shades from a purple vat.

*Example 4*

1 part of 1,5,8-trichloro-anthraquinone-2-carboxylic acid obtained as described in Example 1, 2 parts of aniline, 2 parts of sodium carbonate, 0.5 part of copper sulphate and 30 parts of water are heated under a reflux condenser for 6 hours. The brown solution rapidly becomes deep red. It is poured on to ice and the solution made slightly acid with hydrochloric acid. After standing a short time the precipitate obtained is filtered off, washed free of mineral acid and dried. It is a dark red body and gives an orange solution in concentrated sulphuric acid, and when 40% formaldehyde solution is carefully added to this solution, an intense green color at once develops.

*Example 5*

5 parts of the product described in Example 4 are heated with 50 parts of concentrated sulphuric acid in a water bath at 100° C. for 1 hour. The solution is poured into water and the precipitate filtered off, washed free of acid and dried. The material, which is substantially 5,8-dichloroanthraquinone-2,1-benzacridone is a dark brown body and dyes cotton in pink shades from a brown vat.

*Example 6*

10.7 parts of 1,5,8-trichloroanthraquinone-2-carboxylic acid, 7.6 parts of 4'-methyl-3'-aminobenzoyl-2-benzoic acid, 16 parts of soda ash, 1 part of copper sulphate and 100 parts of water are heated together for 16 hours in a salt bath at 103°–105° C. The reaction mixture is poured into 500 cc. of water and any insoluble matter filtered off. The filtrates are acidified with dilute hydrochloric acid and after standing some time the precipitate obtained is filtered off, washed free of acid and dried. It is a purple colored material and gives a brown solution in concentrated sulphuric acid. When 40% formaldehyde solution is added to this solution an intense bluish green coloration is obtained.

*Example 7*

7 parts of the product described in Example 6 are heated with 70 parts of 100% sulphuric acid at 135° C. for 2½ hours. The solution is cooled, poured on to ice and the precipitate obtained filtered off, washed free of acid and dried. The product, which is a dark brown body, dyes cotton in orange shades from a deep violet colored vat. It appears to be a dichlorodianthraquinoneacridone of probable formula:

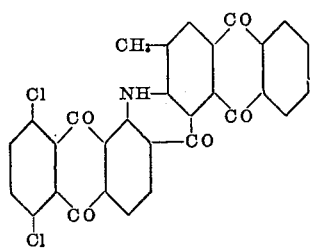

It is apparent that our invention is capable of wide application and variation as to the nature of the o-arylene residue Ar. Moreover the dichloro-anthraquinoneacridones when obtained may be submitted, as hereinbefore explained, to a variety of further treatments.

As many apparently and widely different embodiments of this invention may be made without departing from the spirit and scope thereof, it is to be understood that we do not limit ourselves to the specific embodiments thereof except as defined in the appended claims.

We claim:

1. In the process of manufacturing vat dyestuffs, the step which comprises condensing 1,5,8-trichloro-anthraquinone-2-carboxylic acid with an arylamine of the benzene, naphthalene, and anthracene series, containing replaceable hydrogen in the amino group.

2. The process of manufacturing an intermediate for vat dyestuffs which comprises condensing 1,5,8-trichloro-anthraquinone-2-carboxylic acid with an arylamine of the benzene, naphthalene and anthracene series whereby to replace the 1-chlorine atom by the arylamine, and ring-closing said 1-arylamino-5,8-dichloro-anthraquinone-2-carboxylic acid to produce the corresponding dichloro-anthraquinone-acridone.

3. A process as in claim 2, the ring-closure being effected by heating in concentrated sulfuric acid.

4. A process as in claim 2, the ring-closure being effected by first acetylating the imino group and then heating in concentrated sulfuric acid.

5. A compound of the anthraquinoneacridone series corresponding to the general formula:

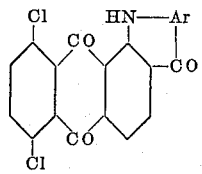

wherein Ar stands for an o-arylene radical of the benzene, naphthalene and anthracene series.

6. In the process of manufacturing vat dyestuffs, the step which comprises condensing 1,5,8-trichloro-anthraquinone-2-carboxylic acid with beta-naphthylamine.

7. The process of manufacturing an intermediate for vat dyestuffs, which comprises condensing 1,5,8-trichloro-anthraquinone-2-carboxylic acid with beta-naphthylamine to produce 1-beta-naphthylamino-5,8-dichloro-anthraquinone-2-carboxylic acid, and ring closing the latter body to produce 5,8-dichloro-anthraquinone-2,1-($\beta$)-naphthacridone.

8. A process as in claim 7, the ring-closure being effected by first acylating the imino group and then heating in concentrated sulfuric acid.

9. 5,8-dichloro-anthraquinone-2,1-($\beta$)-naphthacridone.

ROBERT FRASER THOMSON.
WILLIAM SMITH.
JAMES PRIMROSE.